(12) United States Patent
Kennedy et al.

(10) Patent No.: US 7,950,060 B1
(45) Date of Patent: May 24, 2011

(54) METHOD AND APPARATUS FOR SUPPRESSING E-MAIL SECURITY ARTIFACTS

(75) Inventors: Mark Kennedy, Redondo Beach, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 838 days.

(21) Appl. No.: 11/864,867

(22) Filed: Sep. 28, 2007

(51) Int. Cl.
*G06F 12/14* (2006.01)
(52) U.S. Cl. ........................................................ 726/24
(58) Field of Classification Search ........................ None
See application file for complete search history.

(56) References Cited

U.S. PATENT DOCUMENTS

| | | | |
|---|---|---|---|
| 7,337,448 B1* | 2/2008 | Dalia et al. | 719/328 |
| 2002/0095607 A1* | 7/2002 | Lin-Hendel | 713/201 |
| 2003/0154394 A1* | 8/2003 | Levin | 713/200 |
| 2004/0230806 A1* | 11/2004 | Lisanke | 713/182 |
| 2007/0240215 A1* | 10/2007 | Flores et al. | 726/24 |
| 2007/0289018 A1* | 12/2007 | Steeves et al. | 726/24 |

* cited by examiner

*Primary Examiner* — David J Pearson
(74) *Attorney, Agent, or Firm* — Hunton & Williams, LLP

(57) ABSTRACT

Method and apparatus for suppressing e-mail security artifacts is described. An aspect of the invention relates to processing e-mail addresses stored in an address book repository on a computer. A request for one or more e-mail addresses is received from a source. Authenticity of the source is verified. The one or more e-mail addresses is (are) obtained from the address book repository. The one or more e-mail addresses is (are) filtered to remove one or more honeypot e-mail addresses. The one or more e-mail addresses is (are) forwarded as filtered to the source if the source is authentic. The one or more e-mail addresses is (are) forwarded as obtained to the source if the source is not authentic. Accordingly, the honeypot addresses are not filtered if the source is not authentic.

20 Claims, 4 Drawing Sheets

US 7,950,060 B1

METHOD AND APPARATUS FOR SUPPRESSING E-MAIL SECURITY ARTIFACTS

BACKGROUND OF THE INVENTION

1. Field of the Invention

The present invention relates generally to computer systems and software. More particularly, the present invention relates to a method and apparatus for suppressing e-mail security artifacts.

2. Description of the Related Art

Some e-mail security products add bogus addresses to the address book used by e-mail clients (generally referred to as e-mail security artifacts). These bogus addresses are also known as "honeypot addresses." The honeypot addresses masquerade as actual e-mail addresses in a user's address book, but are actually fictitious addresses insofar as they relate to the user's actual contacts. Normally, a user does not use the honeypot address to send any e-mail. However, malicious software accessing a user's address book may not distinguish between actual addresses and the honeypot address. If malicious software enumerates a user's address book to send e-mails, the malicious software may end up sending e-mails to the honeypot addresses. The e-mail security products monitor these honeypot addresses and can thus detect the presence of the malicious software on the user's computer. The e-mail security products are then capable of taking further action to affect deletion of the malicious software.

The addition of honeypot addresses to a user's address book can have various unintended negative effects on the user. For example, the e-mail security products may add the honeypot addresses to the user's address book without the user's knowledge. When the user accesses his or her address book, the honeypot addresses may cause confusion over what they are and why they are in the address book. In some cases, a user may accidentally send e-mails to the honeypot addresses, causing false positive detections by the e-mail security product. Even for savvy users, the honeypot addresses clutter the address book. A user may be required to manually filter out the honeypot addresses when viewing the address book, thus impeding productivity. Accordingly, there exists a need in the art for a method and apparatus for suppressing e-mail security artifacts.

SUMMARY OF THE INVENTION

Method and apparatus for suppressing e-mail security artifacts is described. An aspect of the invention relates to processing e-mail addresses stored in an address book repository on a computer. A request for one or more e-mail addresses is received from a source. Authenticity of the source is verified. The one or more e-mail addresses is (are) obtained from the address book repository. The one or more e-mail addresses is (are) filtered to remove one or more honeypot e-mail addresses. The one or more e-mail addresses is (are) forwarded as filtered to the source if the source is authentic. The one or more e-mail addresses is (are) forwarded as obtained to the source if the source is not authentic. Accordingly, the honeypot addresses are not filtered if the source is not authentic.

In another embodiment, a request for one or more e-mail addresses is received from a source. Authenticity of the source is verified. The one or more e-mail addresses is (are) obtained from a first address book repository if the source is not authentic. The first address book repository includes both actual e-mail addresses and one or more honeypot e-mail addresses. The one or more e-mail addresses is (are) obtained from a second address book repository if the sources is authentic. The second address book repository does not include the one or more honeypot e-mail addresses. The one or more e-mail addresses is (are) forward as obtained to the source.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
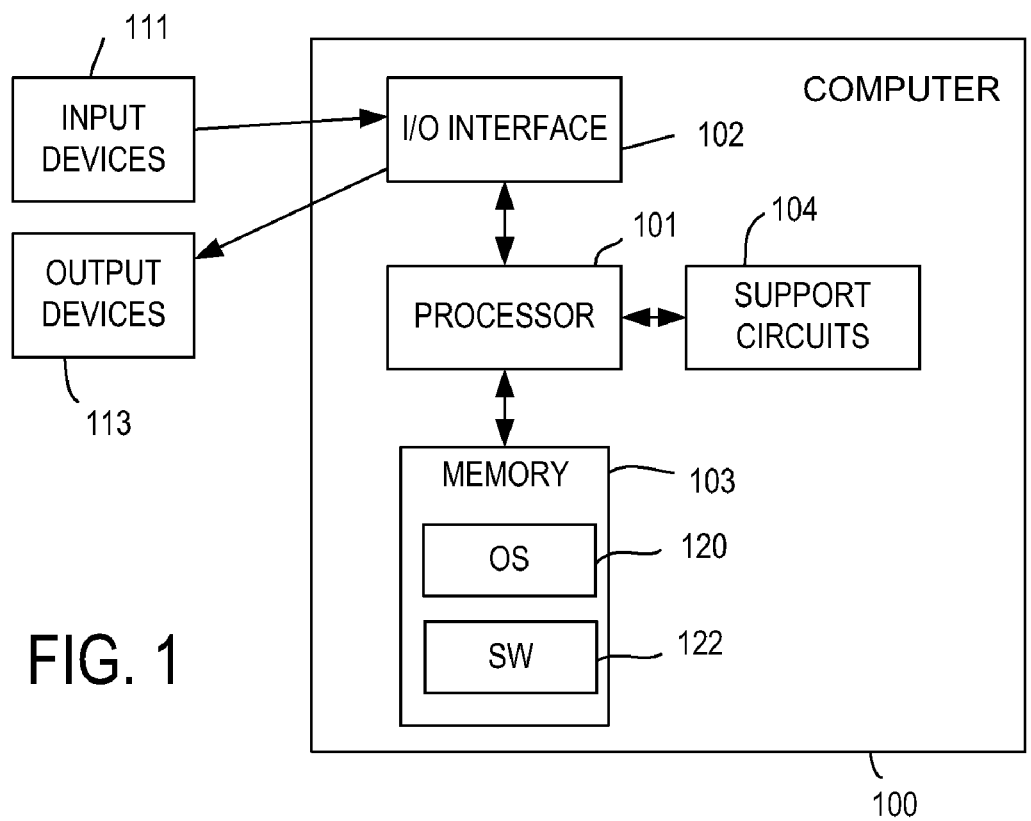
FIG. 1 is a block diagram depicting an exemplary embodiment of a computer 100 configured to implement the processes and methods described herein in accordance with one or more aspects of the invention.

FIG. 1 is a block diagram depicting an exemplary embodiment of a computer 100 configured to implement the processes and methods described herein in accordance with one or more aspects of the invention. The computer 100 illustratively includes a processor 101, a memory 103, various support circuits 104, an I/O interface 102. The processor 101 may include one or more microprocessors known in the art. The support circuits 104 for the processor 101 include conventional cache, power supplies, clock circuits, data registers, I/O interfaces, and the like. The I/O interface 102 may be directly coupled to the memory 103 or coupled through the processor 101. The I/O interface 102 may also be configured for communication with input devices 111 and/or output devices 113, such as, network devices, various storage devices, mouse, keyboard, display, and the like. The I/O interface 102 may also coupled to a network 150, such as the local area network (LAN), a wide area network (WAN), the Internet, and the like. The memory 114 may include one or more of the following random access memory, read only memory, magneto-resistive read/write memory, optical read/write memory, cache memory, magnetic read/write memory, and the like, as well as signal-bearing media as described below. The computer 100 may be configured with an operating system (OS) 120, which may include OS/2, Java Virtual Machine, Linux, Solaris, Unix, HPUX, AIX, Windows, Windows Server, among other known platforms. At least a portion of the OS 120 may be disposed in the memory 103. The memory 103 may also store software (SW) 122 configured for execution by the processor 101.

Figure 2:
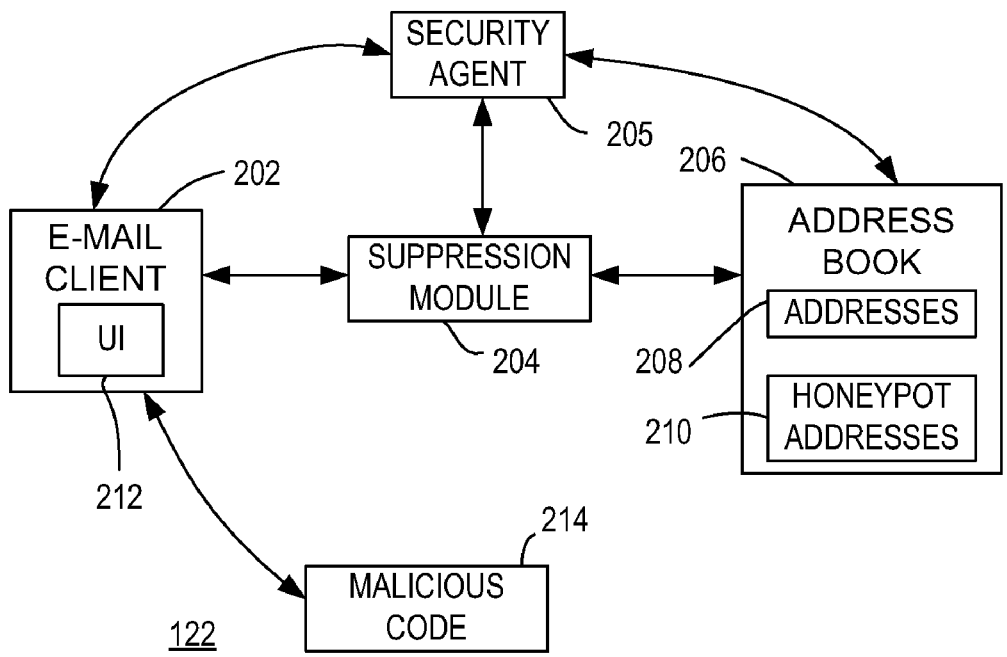
FIG. 2 is a block diagram depicting an exemplary embodiment of software executed by the computer of FIG. 1 in accordance with one or more aspects of the invention.

FIG. 2 is a block diagram depicting an exemplary embodiment of the software 122 in accordance with one or more aspects of the invention. The software 122 includes an e-mail client 202, a suppression module 204, a security client 205, and an address book repository 206. For purposes of exposition, the software 122 is also shown as having malicious code 214. The e-mail client 202 may comprise any type of software configure to manage e-mail. Exemplary e-mail clients include MICROSOFT OUTLOOK, MICROSOFT OUTLOOK EXPRESS, MOZILLA THUNDERBIRD, and the like known in the art. The e-mail client 202 includes a user interface (UI) 212 that provides a mechanism to allow users to manipulate the e-mail client 202 and to allow the e-mail client 202 to produce the effects of the users' manipulation. Notably, the UI 212 may be configured to allow users to access, view, modify, create, and the like contacts listed in the address book repository 206.

The address book repository 206 may comprise separate software or may be part of the e-mail client 202. The address book repository 206 is configured to store contacts created by the user, either directly through the address book repository 206 or through interaction with the UI 212 of the e-mail client. A contact includes various types of information associated with an individual, company, or the like, such as names, mailing addresses, telephone and fax numbers, and e-mail addresses. Accordingly, the address book repository 206 is configured to store a list of e-mail addresses 208 created by the user. The UI 212 may access e-mail addresses stored in the address book 206 to retrieve an e-mail address in the context of creating a new email, enumerate the e-mail addresses in the context of browsing the address book repository 206, and the like.

The security client 205 is configured to implement e-mail security for the user. The security client 205 interfaces with the address book 206 and the e-mail client 202 to monitor for and handle attacks by malicious code. To implement protection, the security client 205 establishes a multiplicity of security artifacts. Notably, the security client 205 may insert a plurality of honeypot addresses 210 into the address book repository 206. In some cases, the security client 205 will insert the honeypot addresses 210 unbeknownst to the user.

The suppression module 204 provides an interface between the UI 212 of the e-mail client 202 and the address book repository 206. If the UI 212 requests access to e-mail address(es) in the address book repository 206, the suppression module 204 is configured to filter out the honeypot addresses 210 and provide access to only the actual addresses 208. In some embodiments, the suppression module 204 interfaces with the security client 205 in order to obtain knowledge of which addresses in the address book repository 206 are the honeypot addresses 210. In some embodiments, the suppression module 204 may be part of the security client software and thus will have direct knowledge of which addresses are the honeypot addresses 210.

The suppression module 204 is further configured to verify that the requested access originated from an authorized source. For example, the UI 212 of the e-mail client 202 may be an authorized source. The suppression module 204 may maintain one or more identities of authorized sources. If the requested access originates from an unauthorized source, the suppression module 204 does not filter the honeypot addresses 210. In some cases, the user may be accessing the address book repository 206 legitimately using some unauthorized software. In such cases, the user will be presented with the honeypot addresses 210. However, in other cases, the unauthorized access is on behalf of the malicious code 214. In such cases, the malicious code 214 will be presented with the honeypot addresses 210, thus allowing the protective measures implemented by the security client 205 to operate.

In one exemplary implementation, the suppression module 204 includes a callback function. The suppression module 204 registers the callback function with the e-mail client 202 or with the OS 120. By registration, the e-mail client 202 or the OS 120 will intercept function calls to the address book repository 206 and pass them to the registered callback function. The function calls are configured to retrieve an e-mail address, enumerate e-mail addresses, and the like. The suppression module 204 can then process the function calls to verify that they have originated from an authorized source. Verification may be performed by analyzing parameters associated with function calls. For example, the function calls may include one or more parameters that uniquely determine the identity of the calling object (a "fingerprint" of the calling object). The parameters may be selected such that the fingerprint is sufficiently unique and sufficiently difficult, if at all possible, to fake. The suppression module 204 may be configured with one or more of such fingerprints associated with one or more authorized sources. If a given function call yields a fingerprint that matches an authorized source, then the function call is verified. Otherwise, the function call is deemed to have originated from an unauthorized source.

Having verified a function call, the suppression module 204 forwards the function call to the address book repository 206 for handling. The address book repository 206 returns the requested e-mail address(es) to the suppression module 204. The suppression module 204 then filters out the honeypot addresses 210 if any are returned and if the requesting function call was verified as originating from an authorized source. Otherwise, the suppression module 204 does not perform any filtering of the returned address(es). The suppression module 204 then forwards the returned address(es) to the originator of the original function call.

Those skilled in the art will appreciate that the above-described implementation of the suppression module 204 is merely exemplary. Those skilled in the art of software design will understand that the suppression module 204 as functionally described above may be implemented using various programming techniques known in the art.

In operation, the UI 212 of the e-mail client 202 may be configured as an authorized source in the suppression module 204. If the UI 212 requests an e-mail address or e-mail addresses, the suppression module 204 will filter the honeypot addresses 210. Thus, the user will not be presented with the honeypot addresses 210, avoiding the problems discussed above. If the malicious code 214 requests an e-mail address or e-mail addresses, the suppression module 204 will detect the requested access as originating from an unauthorized source. The suppression module 204 will not filter the honeypot addresses 210, allowing the protective measures of the security client 205 to operate.

Figure 3:
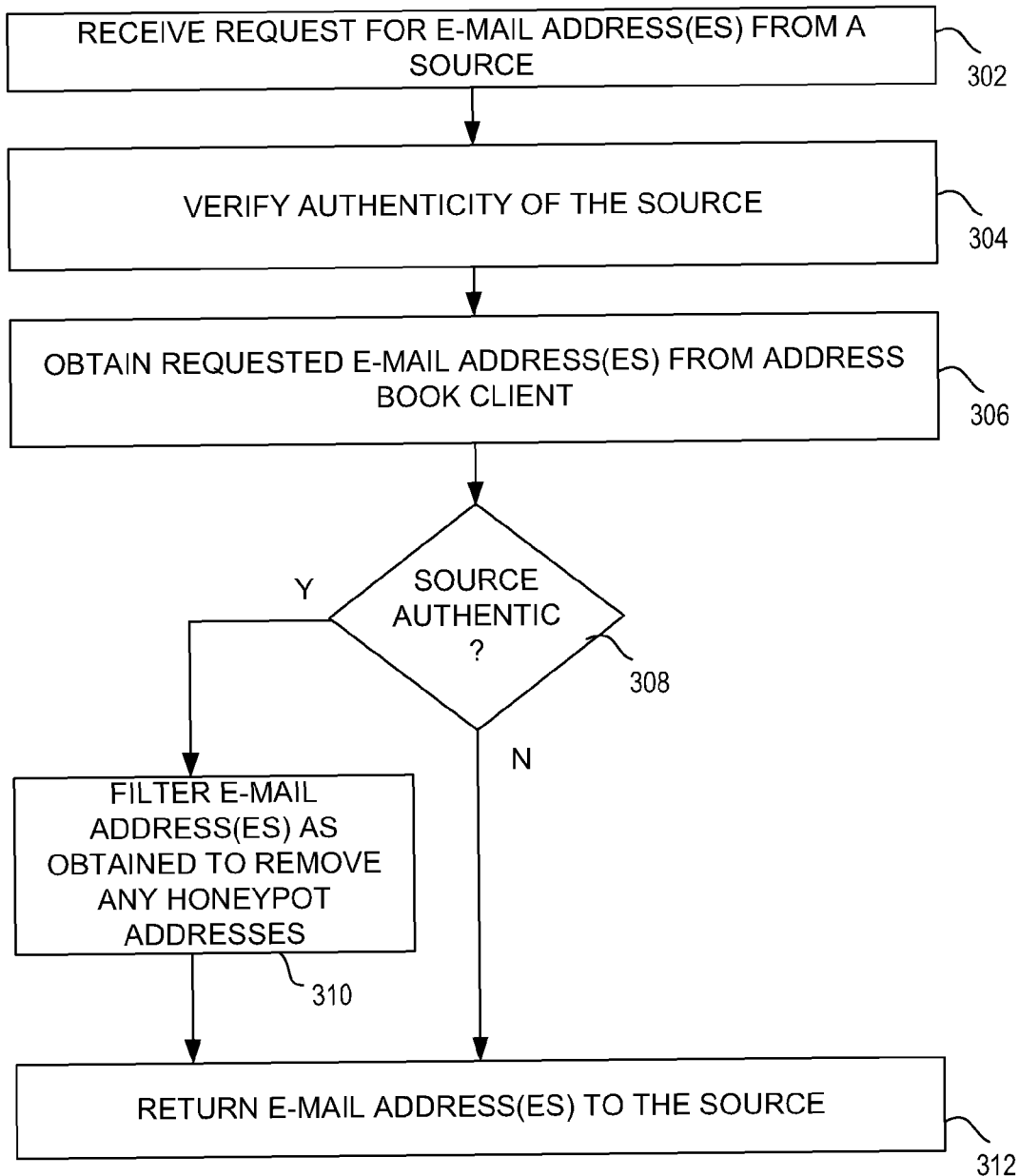
FIG. 3 is a flow diagram depicting an exemplary embodiment of a method of processing e-mail addresses stored in an address book repository on a computer in accordance with one or more aspects of the invention.

FIG. 3 is a flow diagram depicting an exemplary embodiment of a method 300 of processing e-mail addresses stored in an address book repository on a computer in accordance with one or more aspects of the invention. The method 300 may be performed by the suppression module 204 described above. The method 300 begins at step 302, where a request for at least one e-mail address is received from a source. In the exemplary embodiment above, the source may be the UI 212 of the e-mail client 202 or the malicious code 214.

At step 304, the authenticity of the source is verified. In some embodiments, the authenticity of the source is verified by determining an identity of the source. The identity is compared against a list of one or more authorized identities. The identity is deemed authentic if it is in the list; otherwise the identity is deemed as not authentic. At step 306, the requested e-mail address(es) is (are) obtained from the address book repository. At step 308, a determination is made whether the source is authentic. If so, the method 300 proceeds to step 310; otherwise the method 300 proceeds to step 312.

At step 310, the e-mail address(es) is (are) filtered to remove any honeypot addresses therefrom. In some embodiments, filtering is achieved by comparing each of the e-mail addresses as obtained against a list of known honeypot addresses. Any e-mail address in the list is removed.

At step 312, the obtained e-mail address(es) are returned to the source. Notably, if the source was not deemed authentic, the e-mail address(es) is (are) not filtered to remove honeypot addresses.

Figure 4:
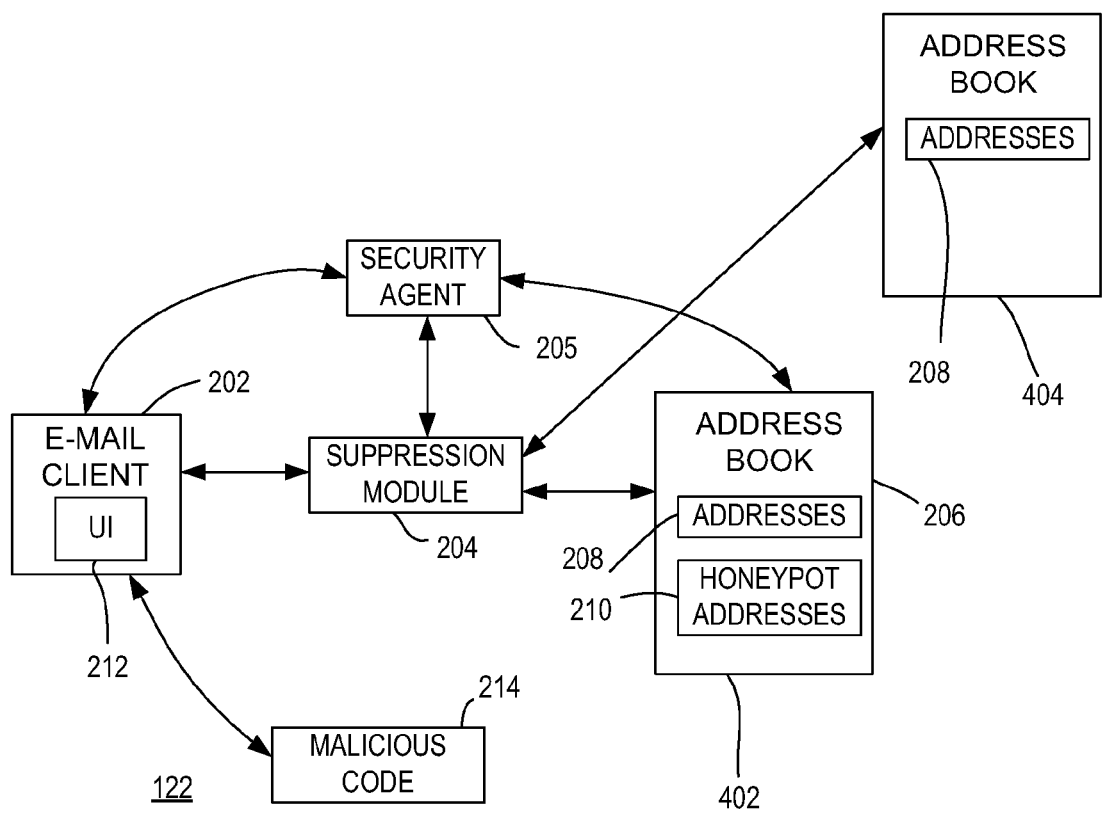
FIG. 4 is a block diagram depicting another exemplary embodiment of software executed by the computer of FIG. 1 in accordance with one or more aspects of the invention.

FIG. 4 is a block diagram depicting another exemplary embodiment of the software 122 in accordance with one or more aspects of the invention. Elements in FIG. 4 that are the same or similar to those of FIG. 2 are designated with identical reference numerals. In the present embodiment, the software 122 includes a first address book repository 402 and a second address book repository 404. The address book repository 402 includes both the addresses 208 and the honeypot addresses 210. The address book repository 404 only includes the addresses 208. Rather than filter the honeypot addresses 210, if an authorized source requests access, the suppression module 204 retrieves the requested e-mail addresses from the address book repository 404 that does not have the honeypot addresses. If an unauthorized source requests access, the suppression module 204 retrieves the requested e-mail addresses from the address book repository 402 that includes the honeypot addresses.

Figure 5:
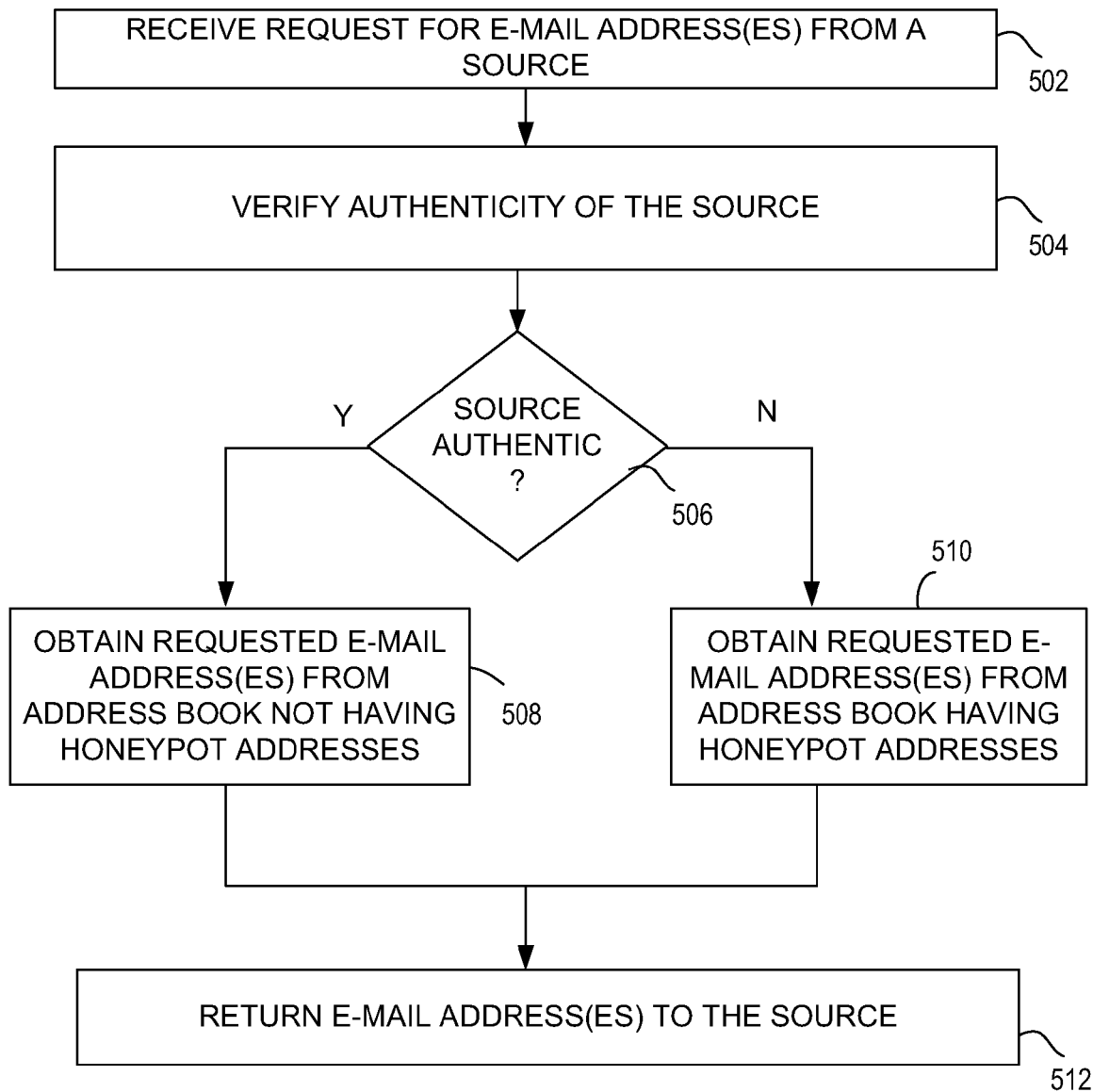
FIG. 5 is a flow diagram depicting another exemplary embodiment of a method of processing e-mail addresses stored in an address book repository on a computer in accordance with one or more aspects of the invention.

FIG. 5 is a flow diagram depicting another exemplary embodiment of a method 500 of processing e-mail addresses stored in address book repositorys on a computer in accordance with one or more aspects of the invention. The method 500 may be performed by the suppression module 204 described in FIG. 4 above. The method 500 begins at step 502, where a request for at least one e-mail address is received from a source. In the exemplary embodiment above, the source may be the UI 212 of the e-mail client 202 or the malicious code 214.

At step 504, the authenticity of the source is verified. In some embodiments, the authenticity of the source is verified by determining an identity of the source. The identity is compared against a list of one or more authorized identities. The identity is deemed authentic if it is in the list; otherwise the identity is deemed as not authentic. At step 506, a determination is made whether the source is authentic. If so, the method 500 proceeds to step 508; otherwise the method 500 proceeds to step 510. At step 508, the requested e-mail address(es) is (are) obtained from an address book repository that does not include honeypot addresses. At step 510, the requested e-mail address(es) is (are) obtained from an address book repository that includes the honeypot addresses. At step 512, the obtained e-mail address(es) are returned to the source.

In the embodiments described above, the memory 103 may store processor-executable instructions and/or data that may be executed by and/or used by a processor. These processor-executable instructions may comprise hardware, firmware, software, and the like, or some combination thereof. Modules having processor-executable instructions that are stored in a memory may include the suppression module 204. In other embodiments, all or a portion of each of the suppression module 204 may be implemented in hardware, software, or a combination of hardware and software, including implementations using programmable logic devices (PLDs), application specific integrated circuits (ASICs), and the like. Thus, the term "module" as used herein encompasses software implementations, hardware implementations, or a combination of software and hardware implementations.

In some embodiments, the present invention is an apparatus for processing e-mail addresses stored in an address book repository on a computer. The apparatus may comprise means for receiving a request for one or more e-mail addresses from a source, means for verifying authenticity of the source, means for obtaining the one or more e-mail addresses from the address book repository, means for filtering the one or more e-mail addresses to remove one or more honeypot e-mail addresses and forwarding the one or more e-mail addresses as filtered to the source if the source is authentic, and means for forwarding the one or more e-mail addresses as obtained to the source if the source is not authentic. The apparatus may alternatively comprise means for receiving a request for one or more e-mail addresses from a source, means for verifying authenticity of the source, means for obtaining the one or more e-mail addresses from a first address book repository if the source is not authentic, the first address book repository having both actual e-mail addresses and one or more honeypot e-mail addresses, means for obtaining the one or more e-mail addresses from a second address book repository if the source is authentic, the second address book repository not having the one or more honeypot e-mail addresses, and means for forwarding the one or more e-mail addresses as obtained to the source.

Aspects of the methods described above may be implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of processing e-mail addresses stored in an address book repository on a computer, comprising:
    receiving a request for one or more e-mail addresses from a source;
    verifying authenticity of the source using at least one computer processor;
    obtaining the one or more e-mail addresses from the address book repository;

filtering the one or more e-mail addresses to remove one or more honeypot e-mail addresses and forwarding the one or more e-mail addresses as filtered to the source if the source is authentic; and forwarding the one or more e-mail addresses as obtained to the source if the source is not authentic.

2. The method of claim 1, wherein the source is one of a user interface (UI) of an e-mail client or malicious code, and wherein the UI is authentic and the malicious code is not authentic.

3. The method of claim 1, wherein the step of verifying comprises:
determining an identity of the source;
comparing the identity against one or more authorized identities;
deeming the identity of the source as authentic if the identity is one of the one or more authorized identities; and
deeming the identity of the source as not authentic if the identity is not one of the one or more authorized identities.

4. The method of claim 1, wherein the step of filtering comprises:
comparing each of the one or more e-mail addresses and obtained against a list of known honeypot addresses; and
filtering any of the one or more e-mail addresses present in the list of known honeypot addresses.

5. The method of claim 1, wherein the request is a retrieval of the one or more e-mail addresses for creation of a new e-mail by an e-mail client or an enumeration of the one or more e-mail addresses for browsing of the address book repository.

6. The method of claim 1, wherein the step of receiving comprises:
receiving a function call embodying the request via a callback function.

7. An apparatus for processing e-mail addresses stored in an address book repository on a computer, the apparatus comprising:
at least one processor configured to:
receive a request for one or more e-mail addresses from a source;
verify authenticity of the source;
obtain the one or more e-mail addresses from the address book repository;
filter the one or more e-mail addresses to remove one or more honeypot e-mail addresses and forwarding the one or more e-mail addresses as filtered to the source if the source is authentic; and
forward the one or more e-mail addresses as obtained to the source if the source is not authentic; and
at least one memory, coupled to the at least one processor, configured to provide the at least one processor with instructions.

8. The apparatus of claim 7, wherein the source is one of a user interface (UI) of an email client or malicious code, and wherein the UI is authentic and the malicious code is not authentic.

9. The apparatus of claim 7, wherein the verifying comprises:
determining an identity of the source;
comparing the identity against one or more authorized identities;
deeming the identity of the source as authentic if the identity is one of the one or more authorized identities; and
deeming the identity of the source as not authentic if the identity is not one of the one or more authorized identities.

10. The apparatus of claim 7, wherein filtering comprises:
comparing each of the one or more e-mail addresses as obtained against a list of known honeypot addresses; and
filtering any of the one or more e-mail addresses present in the list of known honeypot addresses.

11. The apparatus of claim 7, wherein the request is a retrieval of the one or more email addresses for creation of a new e-mail by an e-mail client or an enumeration of the one or more e-mail addresses for browsing of the address book repository.

12. The apparatus of claim 7, wherein receiving comprises:
receiving a function call embodying the request via a callback function.

13. A method of processing e-mail addresses stored in an address book repository on a computer, comprising:
receiving a request for one or more e-mail addresses from a source;
verifying authenticity of the source using at least one computer processor;
obtaining the one or more e-mail addresses from a first address book repository if the source is not authentic, the first address book repository having both actual e-mail addresses and one or more honeypot e-mail addresses;
obtaining the one or more e-mail addresses from a second address book repository if the source is authentic, the second address book repository not having the one or more honeypot e-mail addresses; and
forwarding the one or more e-mail addresses as obtained to the source.

14. The method of claim 13, wherein the source is one of a user interface (UI) of an email client or malicious code, and wherein the UI is authentic and the malicious code is not authentic.

15. The method of claim 13, wherein the step of verifying comprises:
determining an identity of the source;
comparing the identity against one or more authorized identities;
deeming the identity of the source as authentic if the identity is one of the one or more authorized identities; and
deeming the identity of the source as not authentic if the identity is not one of the one or more authorized identities.

16. The method of claim 13, wherein the request is a retrieval of the one or more e-mail addresses for creation of a new e-mail by an e-mail client or an enumeration of the one or more e-mail addresses for browsing of the address book repository.

17. The method of claim 13, wherein the step of receiving comprises:
receiving a function call embodying the request via a callback function.

18. An apparatus for processing e-mail addresses stored in an address book repository on a computer, the apparatus comprising:
at least one processor configured to:
receive a request for one or more e-mail addresses from a source;
verify authenticity of the source;
obtain the one or more e-mail addresses from a first address book repository if the source is not authentic, the first address book repository having both actual e-mail addresses and one or more honeypot e-mail addresses;
obtain the one or more e-mail addresses from a second address book repository if the source is authentic, the second address book repository not having the one or more honeypot e-mail addresses; and forward the one or more e-mail addresses as obtained to the source; and at least one memory, coupled to the at least one processor, configured to provide the at least one processor with instructions.

19. The apparatus of claim 18, wherein verifying comprises:

determining an identity of the source;

comparing the identity against one or more authorized identities;

deeming the identity of the source as authentic if the identity is one of the one or more authorized identities; and deeming the identity of the source as not authentic if the identity is not one of the one or more authorized identities.

20. The apparatus of claim 18, wherein the request is a retrieval of the one or more e-mail addresses for creation of a new e-mail by an e-mail client or an enumeration of the one or more e-mail addresses for browsing of the address book repository.

* * * * *